(12) United States Patent
Liu

(10) Patent No.: US 11,543,715 B2
(45) Date of Patent: Jan. 3, 2023

(54) DISPLAY SUBSTRATE AND DISPLAY PANEL

(71) Applicants: BEIJING BOE DISPLAY TECHNOLOGY CO., LTD., Beijing (CN); BOE TECHNOLOGY GROUP CO., LTD., Beijing (CN)

(72) Inventor: Xiaona Liu, Beijing (CN)

(73) Assignees: BEIJING BOE DISPLAY TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/333,226

(22) Filed: May 28, 2021

(65) Prior Publication Data

US 2021/0405473 A1 Dec. 30, 2021

(30) Foreign Application Priority Data

Jun. 30, 2020 (CN) .......................... 202021255179.2

(51) Int. Cl.
  *G02F 1/1362* (2006.01)
  *G02F 1/1368* (2006.01)
(52) U.S. Cl.
  CPC ...... *G02F 1/136209* (2013.01); *G02F 1/1368* (2013.01); *G02F 1/136222* (2021.01); *G02F 1/136286* (2013.01)
(58) Field of Classification Search
  CPC ......... G02F 1/133512; G02F 1/133514; G02F 1/1339; G02F 1/136209; G02F 1/136222; G02F 1/136286; G02F 1/1368
  See application file for complete search history.

(56) References Cited

U.S. PATENT DOCUMENTS

| 9,316,859 | B2 | 4/2016 | Shin et al. | |
| 10,551,663 | B2 | 2/2020 | Gu et al. | |
| 10,718,970 | B2 | 7/2020 | Han et al. | |
| 2013/0088672 | A1* | 4/2013 | Shin | G02F 1/1345 349/110 |
| 2014/0146166 | A1* | 5/2014 | Shin | G01B 11/272 348/95 |
| 2018/0299724 | A1* | 10/2018 | Gu | G02F 1/133308 |

FOREIGN PATENT DOCUMENTS

| CN | 103048824 A | 4/2013 |
| CN | 104777665 A | 7/2015 |
| CN | 106154632 A | 11/2016 |
| CN | 106990600 A | 7/2017 |

* cited by examiner

*Primary Examiner* — James A Dudek
(74) *Attorney, Agent, or Firm* — Dilworth & Barrese, LLP.; Michael J. Musella, Esq.

(57) ABSTRACT

A display substrate and a display panel are provided. The display substrate includes: a display region; a frame region at least partially surrounding the display region; a black matrix including a first part in the display region and a second part in the frame region; and an alignment mark which is in the frame region and at a side of the second part of the black matrix away from the display region, and is spaced apart from the black matrix. A planar shape of the second part of the black matrix has a corner part, the alignment mark is opposite to the corner part, and an outer contour of the corner part opposite to the alignment mark includes a concave part which is concave towards the display region.

18 Claims, 7 Drawing Sheets

DISPLAY SUBSTRATE AND DISPLAY PANEL

CROSS REFERENCE TO RELATED APPLICATIONS

The application claims priority to the Chinese patent application No. 202021255179.2, filed on Jun. 30, 2020, the entire disclosure of which is incorporated herein by reference as a part of the present application.

TECHNICAL FIELD

At least one embodiment of the present disclosure relates to a display substrate and a display panel.

BACKGROUND

ESD (Electro-Static discharge) is one of the main factors affecting the yield of electronic products. In electronic products, static electricity may be generated in many ways, such as contact, friction, and induction between elements. Electrostatic charges outside a display region enter the display region through a conductive structure and become interference charges which will cause adverse effects on the display effect of the display region, such as causing light leakage and affecting the picture quality. Electro-Static discharge and interference charges entering the display region also cause the performance of the electronic product unstable and shorten the service life of the electronic product.

SUMMARY

At least one embodiment of the present disclosure provides a display substrate. The display substrate comprises: a display region comprising a display array, wherein the display array comprises a plurality of display pixels distributed in an array, and each of the plurality of display pixel comprises a plurality of sub-pixels; a frame region at least partially surrounding the display region; a black matrix comprising a first part in the display region and a second part in the frame region, wherein the first part defines the plurality of sub-pixels; and an alignment mark which is in the frame region and at a side of the second part of the black matrix away from the display region, and is spaced apart from the black matrix. A planar shape of the second part of the black matrix has a corner part, the alignment mark is opposite to the corner part, and an outer contour of the corner part opposite to the alignment mark comprises a concave part which is concave towards the display region.

For example, in the display substrate provided by at least one embodiment of the present disclosure, a planar shape of the concave part is complementary to a planar shape of an outer contour of the alignment mark close to the concave part.

For example, in the display substrate provided by at least one embodiment of the present disclosure, the outer contour of the alignment mark close to the concave part is right-angled, and the concave part is right-angled; or, the outer contour of the alignment mark close to the concave part is arc-shaped, and the concave part is arc-shaped.

For example, in the display substrate provided by at least one embodiment of the present disclosure, a maximum distance between the concave part and the alignment mark is less than 0.5 mm.

For example, in the display substrate provided by at least one embodiment of the present disclosure, a distance from an edge of the black matrix away from the display region to an edge of the display substrate is less than or equal to 0.5 mm, and the edge of the black matrix and the edge of the display substrate are on a same side of the display region.

For example, in the display substrate provided by at least one embodiment of the present disclosure, the second part of the black matrix is provided with a first annular opening in the frame region, and the first annular opening surrounds the display region; the second part of the black matrix is broken at the first annular opening, the first annular opening divides the second part of the black matrix into an inner part and an outer part which are spaced apart from each other, the inner part is at a side of the first annular opening close to the display region, and the outer part is at a side of the first annular opening away from the display region.

For example, in the display substrate provided by at least one embodiment of the present disclosure, a width of the first annular opening in a direction from the display region to the frame region is less than or equal to 50 μm; and a distance between an edge of the first annular opening away from the display region and an edge of the display substrate is greater than or equal to 0.2 mm and less than or equal to 1.0 mm, and the edge of the first annular opening away from the display region and the edge of the display substrate is are a same side of the display region.

For example, in the display substrate provided by at least one embodiment of the present disclosure, a width of the inner part in a direction from the display region to the frame region is larger than a width of the outer part in the direction from the display region to the frame region.

For example, in the display substrate provided by at least one embodiment of the present disclosure, the second part of the black matrix is provided with a second annular opening in the frame region, and the second annular opening surrounds the display region and is at a side of the first annular opening close to the display region; the inner part is broken at the second annular opening, the second annular opening divides the inner part into a first part and a second part which are spaced apart from each other, the first part is at a side of the second annular opening close to the display region, and the second part is at a side of the second annular opening away from the display region.

For example, in the display substrate provided by at least one embodiment of the present disclosure, a distance from an edge of the second annular opening close to the display region to an edge of the display region is greater than or equal to 0.1 mm and less than or equal to 0.5 mm, and a width of the second annular opening in a direction from the display region to the frame region is less than or equal to 50 μm.

For example, in the display substrate provided by at least one embodiment of the present disclosure, the first annular opening is a closed ring, the second annular opening is a closed ring, and the first annular opening surrounds the second annular opening.

For example, the display substrate provided by at least one embodiment of the present disclosure further comprises a first base substrate, and the black matrix and the alignment mark being on the first base substrate. The display substrate is a color filter substrate, and the color filter substrate comprises a color filter layer which is at least partially at a side of the black matrix away from the first base substrate and comprises a part in the frame region; and an orthographic projection of the second annular opening on the first base substrate is within an orthographic projection of the part of the color filter layer in the frame region on the first base substrate.

For example, in the display substrate provided by at least one embodiment of the present disclosure, the color filter layer comprises a first color filter provided at the side of the black matrix away from the first base substrate; and the orthographic projection of the second annular opening on the first base substrate is within an orthographic projection of the first color filter on the first base substrate, and a color of the first color filter is blue.

For example, in the display substrate provided by at least one embodiment of the present disclosure, the color filter layer further comprises a second color filter which is stacked with the first color filter and at a side of the first color filter away from the first base substrate in the frame region; the orthographic projection of the second annular opening on the first base substrate is within the orthographic projection of the first color filter on the first base substrate and within an orthographic projection of the second color filter on the first base substrate; and a color of the second color filter is different from the color of the first color filter For example, in the display substrate provided by at least one embodiment of the present disclosure, the alignment marks are in a same layer and made of a same material as the black matrix At least one embodiment of the present disclosure further provides a display panel comprising any one of the display substrates as described above.

For example, the display panel provided by at least one embodiment of the present disclosure further comprises an array substrate opposite to the display substrate. The black matrix is at a side of the display substrate close to the array substrate; the display substrate further comprises a first base substrate, and the black matrix and the alignment mark are provided on the first base substrate; the display panel further comprises a frame sealant between the display substrate and the array substrate and in the frame region; and the second part of the black matrix is provided with a first annular opening in the frame region, an orthographic projection of the first annular opening on the first base substrate is within an orthographic projection of the frame sealant on the first base substrate, and the frame sealant is made of an insulation material For example, in the display panel provided by at least one embodiment of the present disclosure, a width of the frame sealant in a direction from the display region to the frame region is greater than 0.4 mm and less than 1.5 mm; and a distance between an edge of the frame sealant away from the display region and an edge of the display panel is greater than or equal to 0.2 mm and less than or equal to 0.5 mm, and the edge of the frame sealant away from the display region and the edge of the display panel are at a same side of the display region For example, in the display panel provided by at least one embodiment of the present disclosure, the array substrate comprises a light shielding structure; and the second part of the black matrix is provided with a second annular opening in the frame region, the second annular opening surrounds the display region and is at a side of the first annular opening close to the display region, and an orthographic projection of the second annular opening of the black matrix on the light shielding structure is at least partially in the light shielding structure For example, in the display panel provided by at least one embodiment of the present disclosure, the array substrate further comprises a driving circuit and the driving circuit comprises: a transistor comprising a gate electrode, a source electrode and a drain electrode; a gate line connected with the gate electrode; and a data line connected with the source electrode. The light shielding structure is in a same layer and made of a same material as the data line, or the light shielding structure is in a same layer and made of a same material as the gate line.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
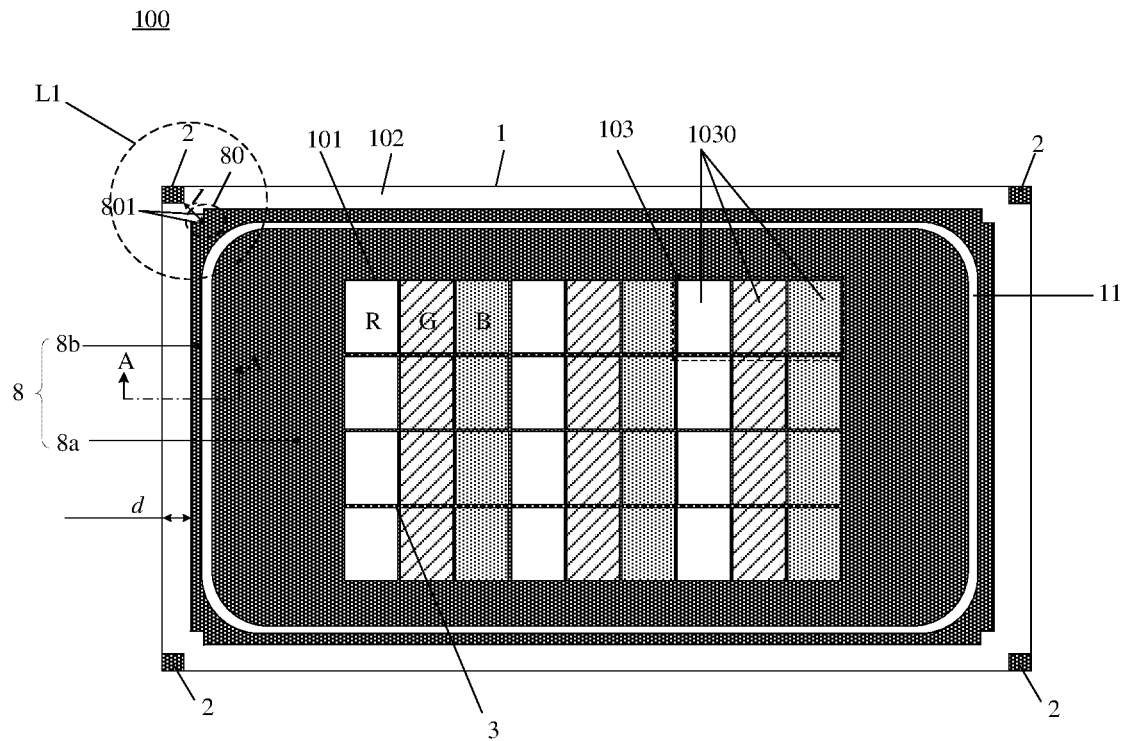
FIG. 1A is a schematic planar view of a display substrate provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a portion but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "comprise," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "Inside," "outside," "on," "under" and the like are only used to indicate relative position relationship, and when the position of the object which is described is changed, the relative position relationship may be changed accordingly.

The dimensions of the drawings used in this disclosure are not strictly drawn according to the actual scale, and the total number of sub-pixels in the display region is not limited to the number illustrated in the drawings. The specific dimension and number of each structure may be determined according to actual needs. The drawings described in this disclosure are only schematic structural diagrams.

A liquid crystal display (LCD) panel for example is provided with a black matrix (BM) which for example is arranged on a color filter substrate. For example, a part of the black matrix in a display region is designed in a grid shape to define a plurality of sub-pixels, so as to prevent light crosstalk between sub-pixels of different colors, and a planar shape of a part of the black matrix located in a frame region is a block or sheet. However, the main material of the black matrix is a mixture of carbon black and resin and the carbon black has a conductive effect; in this case, if the liquid crystal display panel is exposed to external charges, due to the fact that the black matrix is non-insulator, the charges may be transmitted to the inside of the liquid crystal display panel through the black matrix, and then enter the display region, resulting in CF substrate being charged with charges; or, if an electrostatic discharge occurs around the display region, charges may be transferred to the display region of the liquid crystal display panel through the black matrix. These charges entering the display region become interference charges which cause adverse effects on the display effect of the display region, for example, these charges entering the display region interfere with the electric field for driving the liquid crystal to rotate, and thus causes light leakage and affect the picture quality.

In addition, in a process of manufacturing a liquid crystal display panel, an alignment mark for example is formed on a color filter substrate provided with the black matrix by using a same material as the black matrix, and the alignment mark is configured to align the color filter substrate with masks in a process of forming various layers on the color filter substrate through patterning processes. Because the alignment mark is made of the same material as the black matrix, the alignment mark also conducts charges.

At least one embodiment of the present disclosure provides a display substrate, and the display substrate includes a display region, a frame region, a black matrix and an alignment mark. The display region comprises a display array, the display array comprises a plurality of display pixels distributed in an array, and each of the plurality of display pixel comprises a plurality of sub-pixels; the frame region at least partially surrounds the display region; the black matrix comprises a first part in the display region and a second part in the frame region, the first part defines the plurality of sub-pixels; the alignment mark is in the frame region and at a side of the second part of the black matrix away from the display region, and is spaced apart from the black matrix; a planar shape of the second part of the black matrix has a corner part, the alignment mark is opposite to the corner part, and an outer contour of the corner part opposite to the alignment mark comprises a concave part which is concave towards the display region.

Figure 1B:
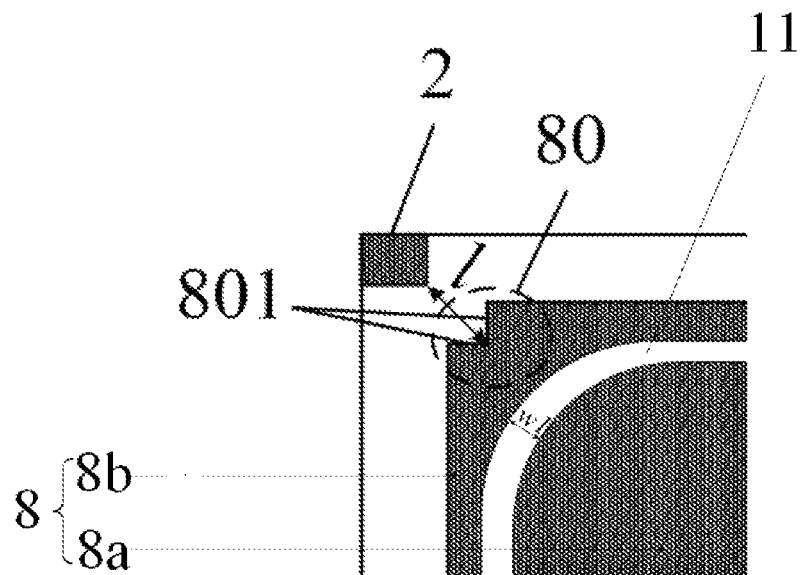
FIG. 1B is a schematic view of a part L1 including a corner part in FIG. 1A.

Exemplarily, FIG. 1A is a schematic planar view of the display substrate provided by at least one embodiment of the present disclosure, and FIG. 1B is a schematic view of a part L1 including a corner part in FIG. 1A. As illustrated in FIG. 1A and FIG. 1B, the display substrate 100 includes a first base substrate 1, a display region 101, a frame region 102, a black matrix 3/8 and an alignment mark 2. The display region 101 includes a display array including a plurality of display pixels 103 distributed in an array, and each display pixel 103 includes a plurality of sub-pixels 1030. The frame region 102 at least partially surrounds the display region. The black matrix 3/8 includes a first part 3 located in the display region 101 and a second part 8 located in the frame region 102. The first part 3 of the black matrix defines the plurality of sub-pixels 1030. The alignment mark 2 is located in the frame region 102 and at a side of the second part 8 of the black matrix away from the display region 101. The alignment mark 2 is spaced apart from the black matrix, for example, is spaced apart from the second part 8 of the black matrix, so that the alignment mark 2 and the black matrix do not contact each other. For example, the display substrate 100 includes a plurality of alignment marks 2. A planar shape of the second part 8 of the black matrix has a corner part 80, for example, has a plurality of corner parts, and the plurality of alignment marks 2 respectively correspond to the plurality of corner parts 80 one by one. For example, for at least one pair of the alignment mark 2 and the corner part 80 that correspond to each other, the alignment mark 2 is opposite to the corner part 80, and an outer contour of the corner part 80 opposite to the alignment mark 2 includes a concave part 801 which is concave towards the display region 101. The alignment mark 2 is located at an outer side of the black matrix, for example, is located at an edge of the display substrate 100; and therefore, the alignment mark 2 is easy to contact the static electricity outside the display substrate 100. There exist many ways to generate static charges, such as contact, friction and induction between elements. In the embodiments of the present disclosure, the concave part 801 sufficiently spaces the black matrix apart from the alignment mark 2, and thus prevents electric charges from being conducted between a tip of the alignment mark 2 and a tip, which is opposite to the tip of the alignment mark 2, of the corner part 80 if the corner part 80 is not concave, thereby preventing the electric charges from the outside of the display substrate 100 from being conducted to the second part 8 of the black matrix through the alignment mark 2, thereby preventing the electric charges from being conducted to the display region 102 through the second part 8 of the black matrix. Therefore, the above-mentioned adverse effects on display caused by the interference charges entering the display region 102 are prevented.

For example, the alignment mark 2 and the black matrix 8/3 are arranged in a same layer and made of a same material. For example, the material of the alignment mark 2 and the black matrix 8/3 include carbon black and resin.

For example, as illustrated in FIG. 1A, for each pair of alignment mark 2 and corner part 80 that correspond to each other, the alignment mark 2 and the corner part 80 are arranged to be opposite to each other, and an outer contour of the corner part 80 opposite to the alignment mark 2 includes the concave part 801 which is concave towards the display region 101, so as to prevent charges from entering the display region through any alignment mark 2 and the black matrix, and achieve a better effect of preventing interference charges from entering the display region.

For example, in the display substrate illustrated in FIG. 1A, a planar shape of the display substrate 100 is rectangular, a planar shape of an outer contour of the second part 8 of the black matrix is substantially rectangular, and the second part 8 of the black matrix includes four corner parts 80, and four alignment marks 2 are arranged on the first base substrate 1 respectively corresponding to the four corner parts 80. Of course, it is also possible to arrange less than four alignment marks 2. The embodiments of the present disclosure do not limit the shape of the second part of the black matrix, the total number of the corner part, and the total number of the alignment mark, these may be designed according to actual needs.

For example, as illustrated in FIG. 1B, a planar shape of the concave part 801 is complementary to a planar shape of the outer contour of the alignment mark 2 close to the concave part 801.

For example, in the display substrate illustrated in FIG. 1B, the outer contour of the alignment mark 2 close to the concave part 801 is right-angled, and the concave part 801 is also right-angled. But the shapes of the two are not limited to the case of right angle, as long as they are complementary to each other.

Figure 3A:
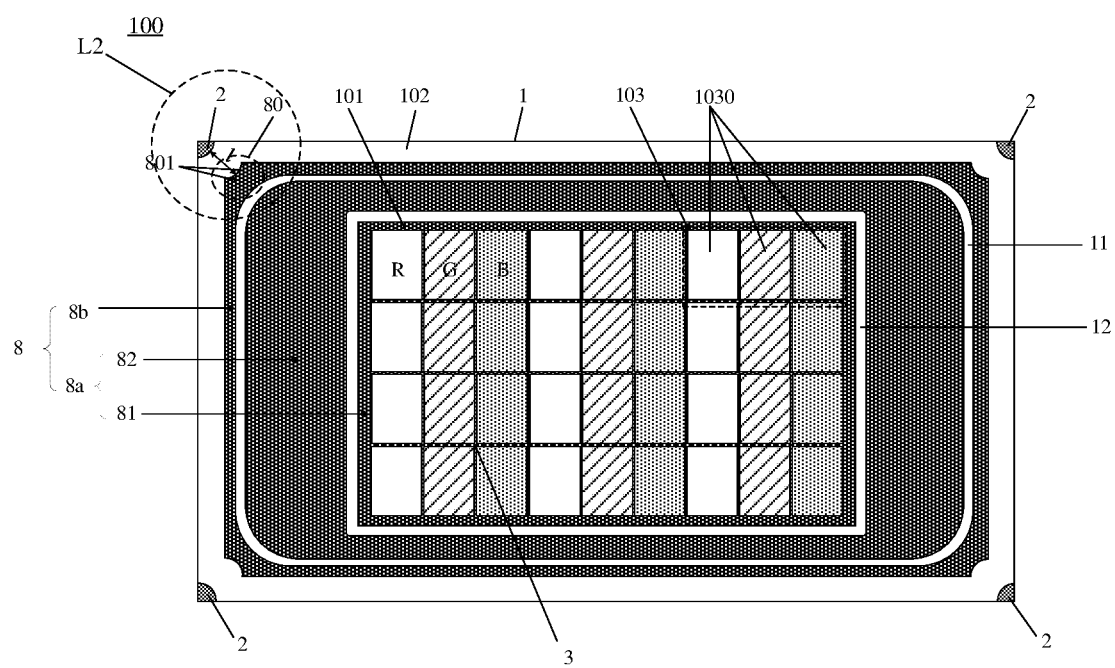
FIG. 3A is further another schematic planar view of the display substrate provided by at least one embodiment of the present disclosure.
Figure 3B:
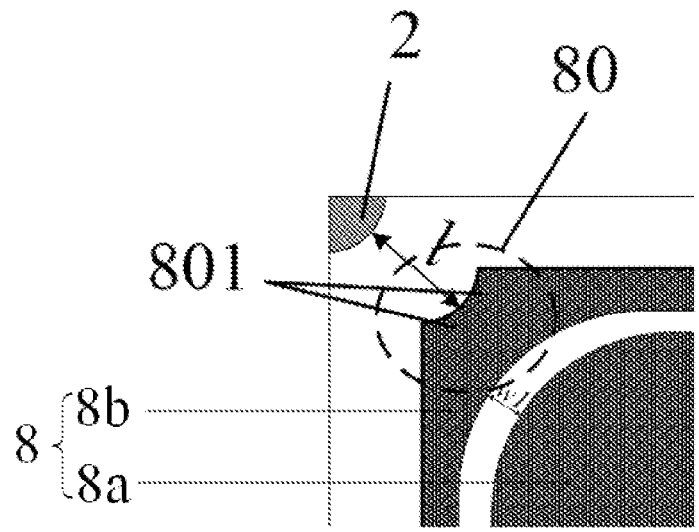
FIG. 3B is a schematic diagram of a part L2 including the corner part in FIG. 3A.

For example, FIG. 3A is another schematic planar view of the display substrate provided by at least one embodiment of the present disclosure, and FIG. 3B is a schematic diagram of a part L2 including the corner part in FIG. 3A. In the display substrate illustrated in FIG. 3A and FIG. 3B, the outer contour of the alignment mark 2 close to the concave part 801 is arc-shaped (for example, circular arc-shaped or non-circular arc-shaped), and the concave part 801 is also arc-shaped. For example, the curvature of the arc of the outer contour of the alignment mark 2 close to the concave part 801 is substantially the same as the curvature of the arc of the concave part 801. Other features and technical effects of the display substrate illustrated in FIG. 3A and FIG. 3B are the same as those in FIG. 1A, and can refer to the description of the display substrate illustrated in FIG. 1A.

For example, as illustrated in FIG. 1A and FIG. 1B, a maximum distance 1 between the concave part 801 and the alignment mark 2 is less than 0.5 mm. An excessive distance between the concave part 801 and the alignment mark 2 is not beneficial to realizing a narrow frame region. In the case where the distance between the concave part 801 and the alignment mark 2 is small, due to the design of the concave part 801 in the embodiments of the present disclosure, the above-mentioned interference charges can be prevented from entering the display region while reducing the width of the frame region as much as possible.

For example, as illustrated in FIG. 1A, a distance d from an edge of the black matrix (for example, the second part 8 of the black matrix) away from the display region 101 to an edge of the display substrate 100 is less than or equal to 0.5 mm, and the edge of the black matrix and the edge of the display substrate 100 are located at a same side of the display region, so that the black matrix has a proper distance from the edge of the display substrate 100, thereby improving or avoiding the phenomenon that charges outside the display substrate 100 enter the display region 101 through the black matrix. And, the distance d cannot be too large; otherwise it is unfavorable for the display substrate 100 to possess a narrow frame region.

For example, as illustrated in FIG. 1A, the second part 8 of the black matrix is provided with a first annular opening 11 in the frame region 102. The first annular opening 11 surrounds the display region 101. The second part 8 of the black matrix located in the frame region 102 is broken at the first annular opening 11, and the first annular opening 11 divides the second part 8 of the black matrix in the frame region 102 into an inner part 8a and an outer part 8b that are spaced apart from each other. Therefore, the first annular opening 11 can prevent charges outside the display substrate 100 from entering the display region 101 through the outer part 8b and the inner part 8a of the black matrix.

For example, as illustrated in FIG. 1A, a width w1 of the first annular opening 11 in a direction from the display region 101 to the frame region 102 is less than or equal to 50 μm, a distance between an edge of the first annular opening 11 away from the display region 101 and the edge of the display substrate 100 is greater than or equal to 0.2 mm and less than or equal to 1.0 mm, and the edge of the first annular opening 11 away from the display region 101 and the edge of the display substrate 100 are located at a same side of the display region 101. For example, the width w1 is further greater than or equal to 10 μm. The range of the width w1 ensures a better charge blocking effect without causing light leakage of the black matrix. If the width w1 is too small, the charge blocking effect is not desirable; if the width w1 is too large, it easily leads to light leakage of the black matrix, thus affecting the display effect.

For example, a shape of the first annular opening 11 is a closed ring to achieve a better effect of blocking charges.

For example, referring to FIG. 1A, a width of the inner part 8a in the direction from the display region 101 to the frame region 102 is larger than a width of the outer part 8b in the direction from the display region 101 to the frame region 102.

Figure 2:
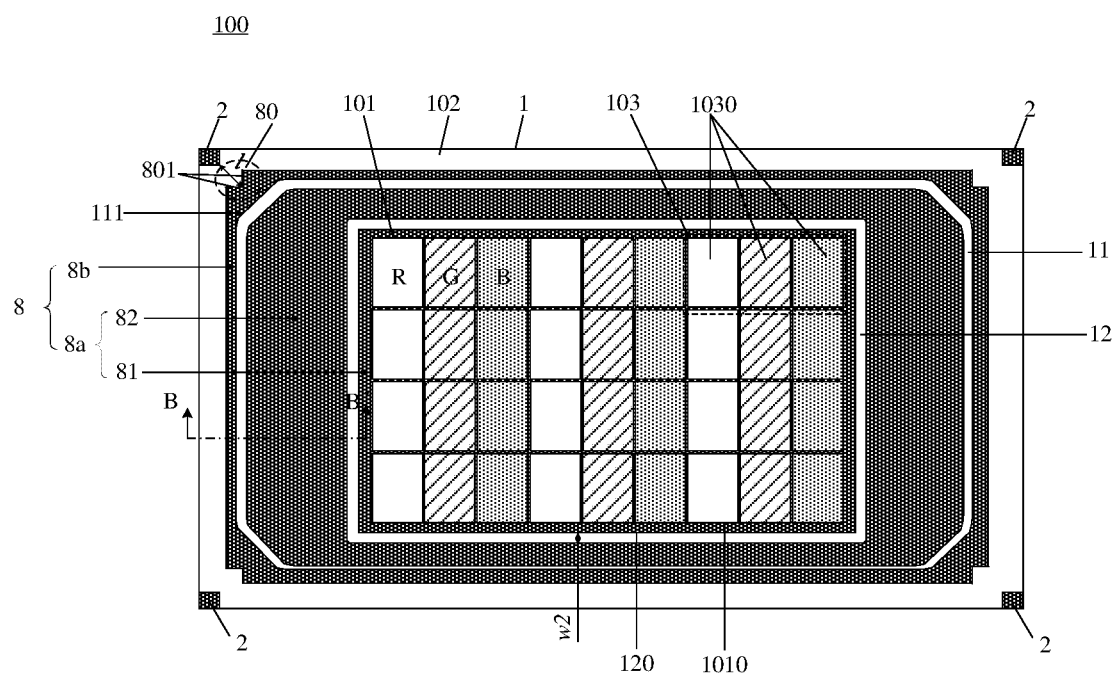
FIG. 2 is another schematic planar view of the display substrate provided by at least one embodiment of the present disclosure.

FIG. 2 is another schematic planar view of the display substrate provided by at least one embodiment of the present disclosure. The display substrate illustrated in FIG. 2 has the following difference from the display substrate illustrated in FIG. 1A. As illustrated in FIG. 2, the display substrate 100 further includes a second annular opening 12 which surrounds the display region 101 and is at a side of the first annular opening 11 close to the display region 101. The inner part 8a is broken at the second annular opening 12, and the second annular opening 12 divides the inner part 8a into a first part 81 and a second part 82 that are spaced apart from each other. The first part 81 of the inner part 8a is located at a side of the second annular opening 12 close to the display region 101, and the second part 82 of the inner part 8a is located at a side of the second annular opening 12 away from the display region 101. The first annular opening 12 further blocks charges outside the display substrate 100 from entering the display region 101 through the outer part 8b, the second part 82 of the inner part 8a and the first part 81 of the inner part 8a of the black matrix.

For example, a distance from an edge 120 of the second annular opening 12 close to the display region 101 to an edge 1010 of the display region 101 is greater than or equal to 0.1 mm and less than or equal to 0.5 mm, and a width w2 of the second annular opening 12 in the direction from the display region 101 to the frame region 102 is less than or equal to 50 μm. The range of the width w2 ensures a better charge blocking effect without causing light leakage of the black matrix. For example, the width w2 is greater than or equal to 10 μm. If the width w2 is too small, the charge blocking effect is not desirable. If the width w2 is too large, it easily leads to light leakage of the black matrix, thus affecting the display effect.

For example, a shape of the second annular opening 12 is also a closed ring to further achieve a better effect of blocking charges.

For example, in the display substrate illustrated in FIG. 2, the first annular opening 11 has a corner part opposite to the corner part 801 of the black matrix. An edge 111 with the corner part of the first annular opening 11 is a straight line segment, and a distance from the edge 111 to the edge of the first base substrate 1 (or an outer edge of the frame sealant hereinafter) is larger than a distance from edges of other positions (not the corner part of the first annular opening 11) of the first annular opening 11 to the outer edge of the frame sealant. For example, as illustrated in FIG. 2, a planar shape of the first annular opening 11 is rectangle with four corners being cut off.

For example, the display substrate 100 is a color filter substrate, the color filter substrate includes a color filter layer, the color filter layer is at least partially located at a side of the black matrix away from the first base substrate, and includes a part located in the frame region; an orthographic projection of the second annular opening on the first base substrate is located within an orthographic projection of the part of the color filter layer located in the frame region on the first base substrate.

Figure 5A:
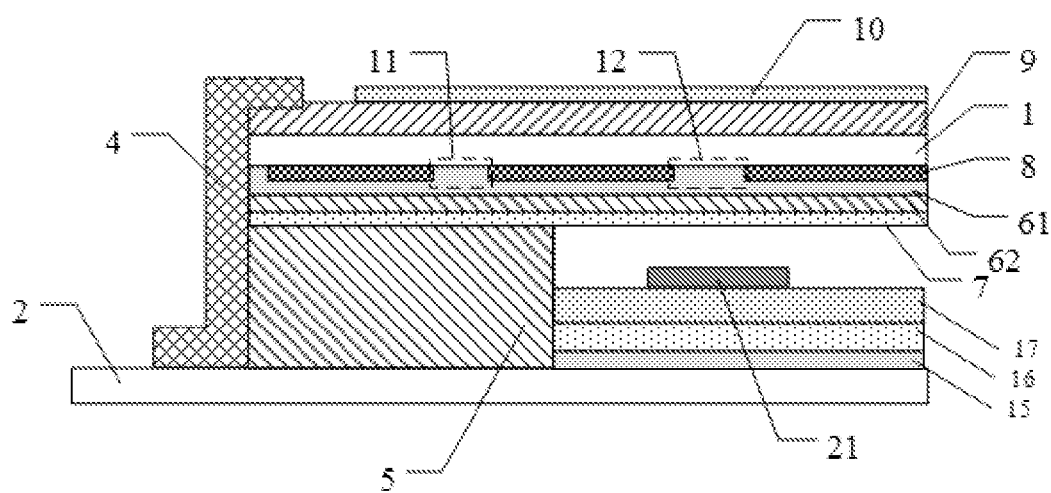
FIG. 5A is a schematic cross-sectional view taken along the line B-B' in FIG. 3D.

For example, FIG. 5A is a schematic cross-sectional view of the display panel 10 adopting the display substrate (i.e. the color filter substrate) illustrated in FIG. 2 along the position corresponding to the line B-B' in FIG. 2. As illustrated in FIG. 5A, the color filter layer includes a first color filter 61. The first color filter 61 is at least partially located at a side of the black matrix (e.g., the second part 8 of the black matrix) away from the first base substrate 1, and includes a part located in the frame region 102. For example, the first color filter 61 further includes a part located in the sub-pixel 1030 of the display region 101, and the part of the first color filter 61 located in the frame region 102 and the part of the first color filter layer 61 located in the display region 101 are arranged in a same layer as, and are formed by a same patterning process. Similarly, each of a second color filter and a third color filter described hereinafter also has a part located in the frame region 102 and a part located in the display region 101 which are arranged in a same layer and are formed by a same patterning process. The orthographic projection of the second annular opening 12 on the first base substrate 1 is within an orthographic projection of the part of the first color filter 61 located in the frame region 102 on the first base substrate 1, so as to prevent the black matrix from leaking light at the position of the second annular opening 12. For example, the orthographic projection of the first annular opening 11 on the first base substrate 1 is also within the orthographic projection of the part of the first color filter 61 located in the frame region 102 on the first base substrate 1, so as to prevent the black matrix from leaking light at the position of first annular opening 11. For example, one display pixel 103 includes three sub-pixels of red, green and blue (RGB). For example, the color of the first color filter 61 is blue, the transmittance of the blue filter is lower than that of the red filter and green filter, and thus it is more effective to prevent the black matrix from leaking light at positions of the second annular opening 12 and the first annular opening 11.

Figure 5B:
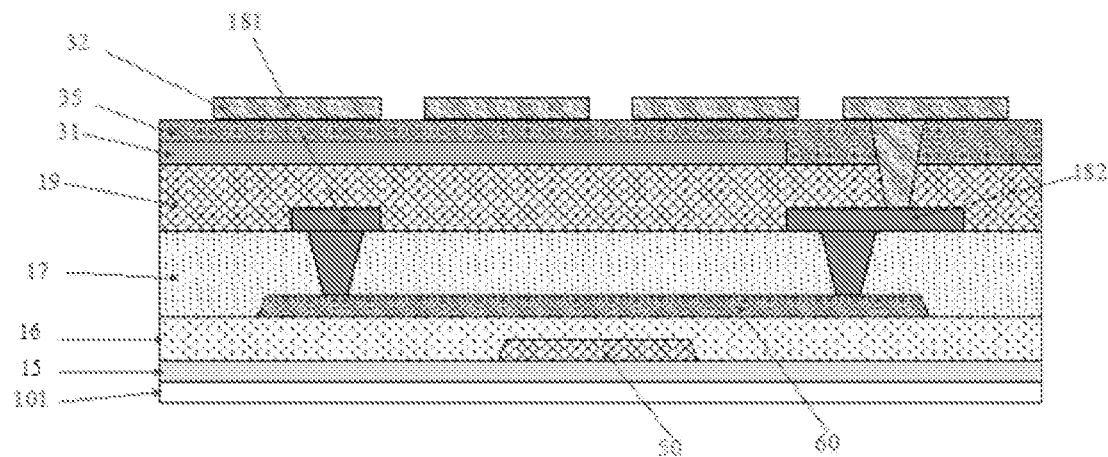
FIG. 5B is a schematic cross-sectional view of a pixel circuit layer in a display region of the display panel in FIG. 5A.
Figure 5C:
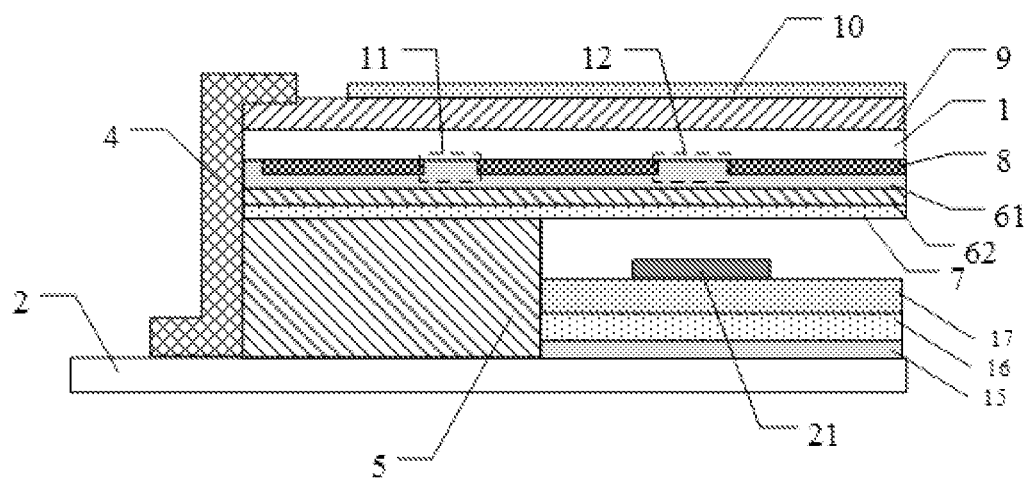
FIG. 5C is another schematic cross-sectional view taken along the line B-B' in FIG. 3D.
Figure 5D:
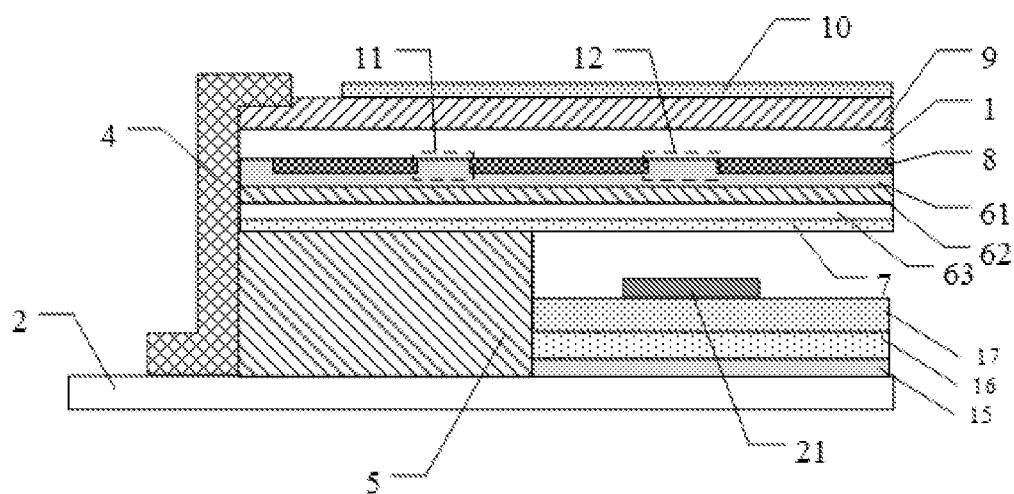
FIG. 5D is further another schematic cross-sectional view taken along the line B-B' in FIG. 3D.
Figure 5E:
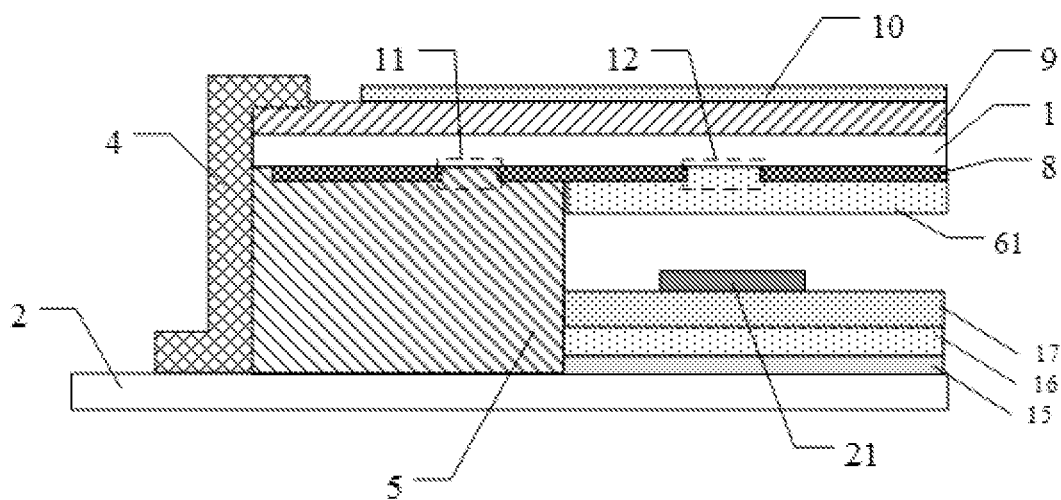
FIG. 5E is further another schematic cross-sectional view taken along the line B-B' in FIG. 3D.

For example, in some embodiments, as illustrated in FIG. 5E, the orthographic projection of the second annular opening 12 on the first base substrate 1 is within the orthographic projection of the part of the first color filter layer 61 located in the frame region 102 on the first base substrate 1, while the orthographic projection of the first annular opening 11 on the first base substrate 1 is not within the orthographic projection of the part of the first color filter layer 61 located in the frame region 102. For example, one display pixel 103 includes three sub-pixels of red, green and blue (RGB). For example, the color of the first color filter 61 is blue, the transmittance of blue filter is lower than that of the red filter and green filter, and thus it is more effective to prevent the black matrix from leaking light at the position of the second annular opening 12.

For example, in the display panel illustrated in FIG. 5C, the color filter layer further includes a second color filter 62, the second color filter 62 is stacked with the first color filter 61 and located at a side of the first color filter 61 away from the first base substrate 1 in the frame region 102. The orthographic projection of the second annular opening 12 on the first base substrate 1 is within the orthographic projection of the first color filter 61 on the first base substrate 1 and within an orthographic projection of the second color filter 62 on the first base substrate 1. The color of the second color filter 62 is different from that of the first color filter to further prevent light leakage.

For example, in the display panel illustrated in FIG. 5D, the color filter layer further includes a third color filter 63, and the third color filter 63, the second color filter 62 and the first color filter 61 are stacked in sequence in the frame region 102. The color of the second color filter 62 is different from that of the first color filter 61, and the color of the third color filter 63 is different from the color of the first color filter 61 and the color of the second color filter 62 to further prevent light leakage.

At least one embodiment of the present disclosure provides a display panel including any one of the display substrates provided by the embodiments of the present disclosure.

Figure 3C:
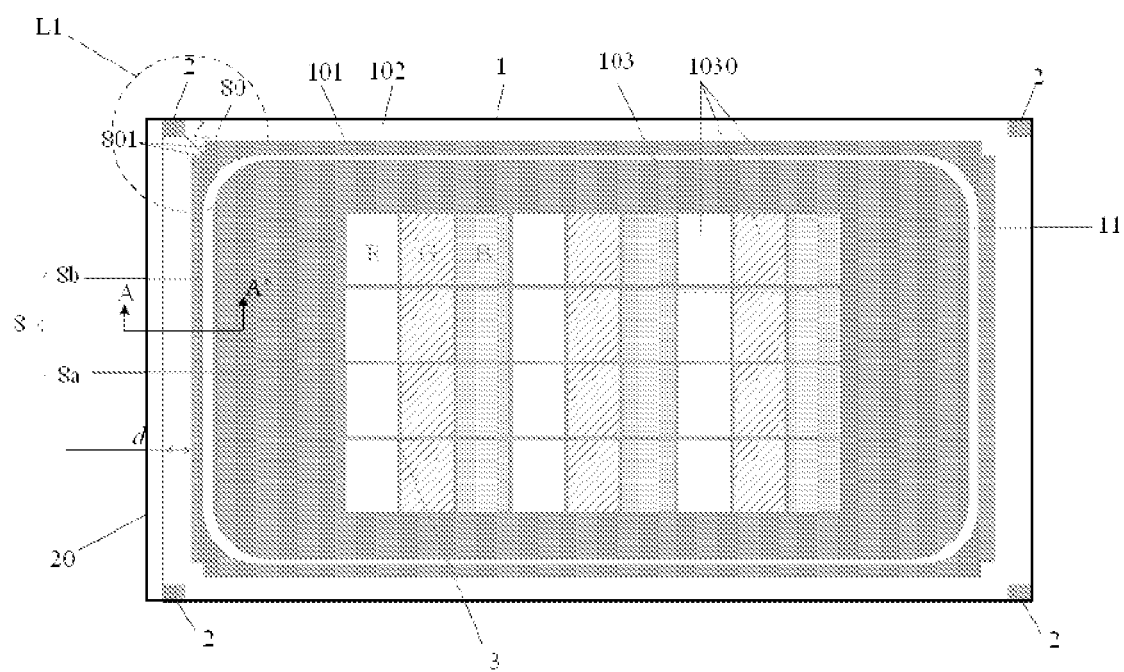
FIG. 3C is a schematic planar view of a display panel including the display substrate illustrated in FIG. 1A provided by at least one embodiment of the present disclosure.
Figure 4A:
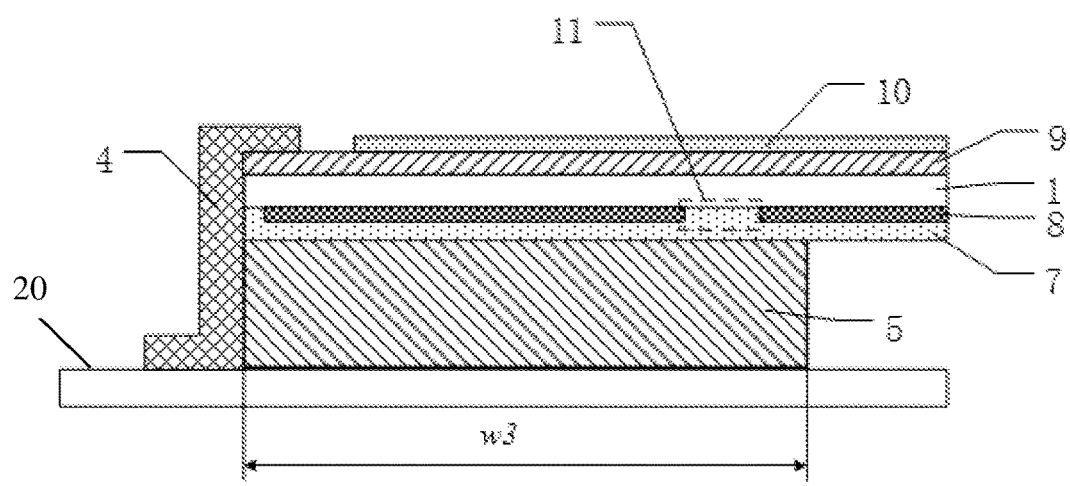
FIG. 4A is a schematic cross-sectional view taken along the line A-A' in FIG. 3C.

Exemplarily, FIG. 3C is a schematic planar view of a display panel including the display substrate illustrated in FIG. 1A, and FIG. 4A is a schematic cross-sectional view taken along the line A-A' in FIG. 3C. As illustrated in FIG. 4A, the display panel further includes an array substrate and a frame sealant 5. The array substrate includes a second base substrate 20 which is arranged opposite to the display substrate 100, and the black matrix (the second part 8 of the black matrix in the frame region is illustrated in FIG. 4A) is located at a side of the display substrate 100 close to the array substrate. For example, the display panel is a liquid crystal display panel, and liquid crystal is filled between the array substrate and the color filter substrate.

For example, the black matrix 8 is located between the first base substrate 1 of the color filter substrate and the frame sealant 5. The frame sealant 5 is located between the display substrate and the array substrate and in the frame region 102. The orthographic projection of the first annular opening 11 on the first base substrate 1 is within an orthographic projection of the frame sealant 5 on the first base substrate 1, and a material of the frame sealant 5 is an insulation material. The frame sealant 5 is arranged in this way further prevents the black matrix from conducting charges.

Figure 4B:
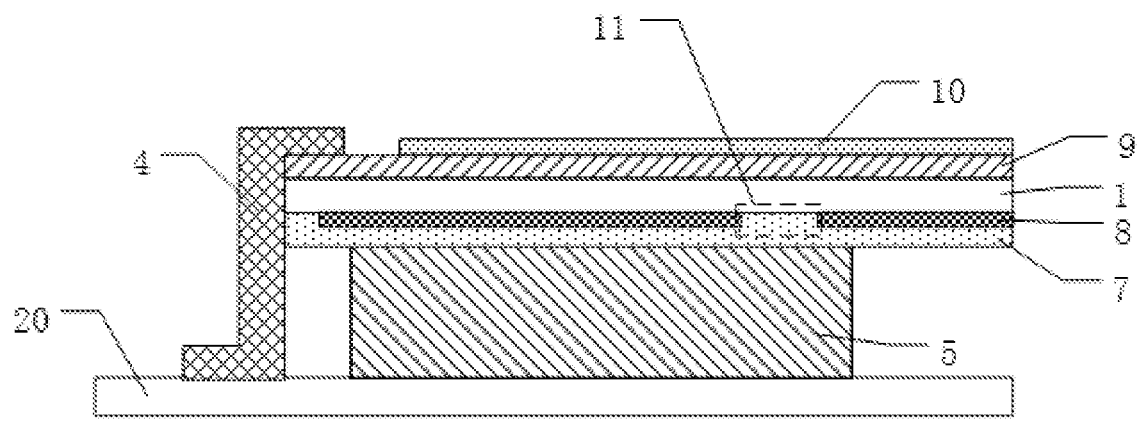
FIG. 4B is another schematic cross-sectional view taken along the line A-A' in FIG. 3C.

As illustrated in FIG. 4A, for example, an outer edge of the frame sealant 5 is aligned with an outer edge of the color filter substrate. For example, as illustrated in FIG. 4B, the outer edge of the frame sealant 5 is at an inner side of the outer edge of the color filter substrate. Other features and corresponding technical effects of the display panel illustrated in FIG. 4B are the same as those in FIG. 4A, and can refer to the description of FIG. 4A.

For example, as illustrated in FIG. 4A, a width w3 of the frame sealant 5 in the direction from the display region 101 to the frame region 102 is greater than 0.4 mm and less than 1.5 mm, and a distance between an edge of the frame sealant 5 away from the display region 101 and an edge of the display panel (that is, an edge of the second base substrate) is greater than or equal to 0.2 mm and less than or equal to 0.5 mm. The range of the width w3 can ensure a better charge blocking effect without causing the frame region to be too wide. If the width w3 is too small, the charge blocking effect is not desirable; if the width w3 is too large, the frame region is too wide.

As illustrated in FIG. 4A, the display panel further includes a conductive adhesive 4 connected to both the display substrate and the array substrate. For example, the frame sealant 5 is in contact with the conductive adhesive 4, and the conductive adhesive 4 is connected to the array substrate 2 which is grounded, so that the conductive adhesive 4 electrically conducts at least a part of the electrostatic charges of the display panel. For example, the black matrix (the second part 8 of the black matrix in the frame region is illustrated in FIG. 4A) is paced apart from the conductive adhesive 4.

For example, as illustrated in FIG. 4A, a flat layer 7 is disposed between the black matrix 8 and the frame sealant 5, and a polarization plate 10 is disposed at a side of the color filter substrate away from the array substrate.

Figure 4C:
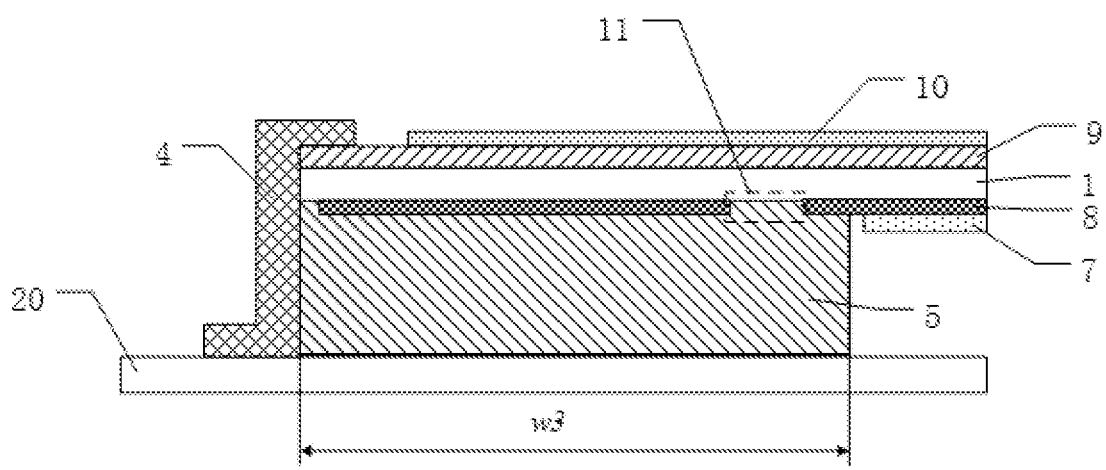
FIG. 4C is further another schematic cross-sectional view taken along the line A-A' in FIG. 3C.

In some embodiments, as illustrated in FIG. 4C, the frame sealant 5 fills the first annular opening 11, for example, the frame sealant 5 is in contact with the first base substrate 1 through the first annular opening 11 to enhance the bonding strength of the frame sealant 5 between the first base substrate 1 and the second base substrate 20. For example, the frame sealant 5 includes a part located between the edge of the black matrix layer 8 and the edge of the first base substrate 1, and this part of the frame sealant 5 is in contact with the first base substrate 1 to further enhance the bonding strength of the frame sealant 5 to the first base substrate 1 and the second base substrate 20.

Figure 3D:
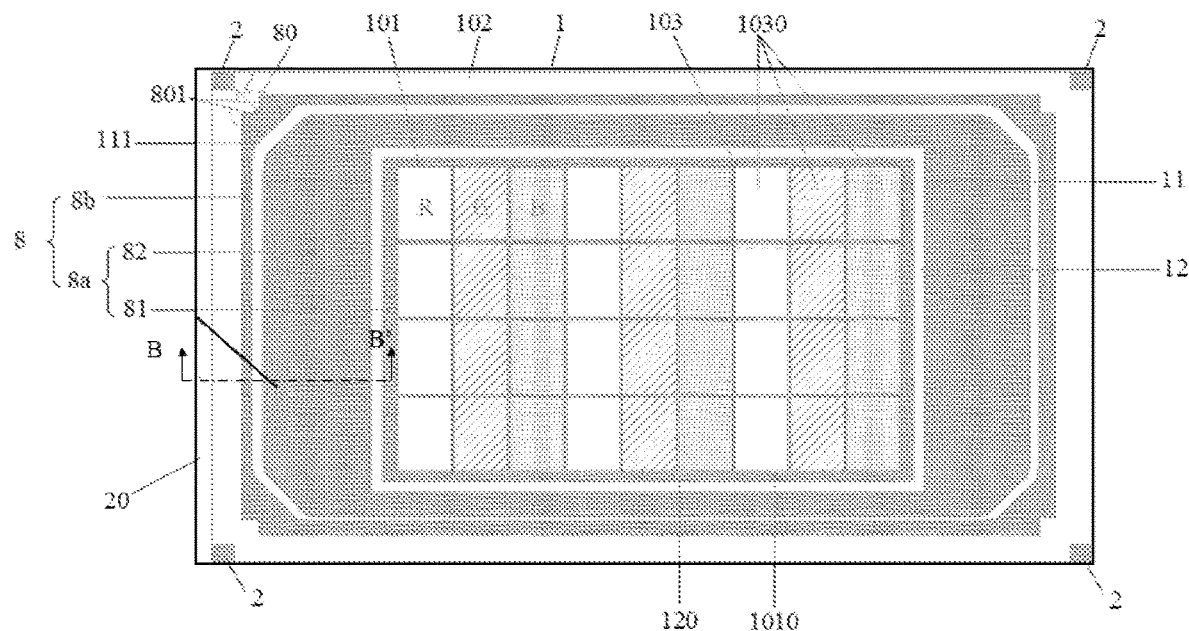
FIG. 3D is a schematic planar view of the display panel including the display substrate illustrated in FIG. 2 provided by at least one embodiment of the present disclosure.

FIG. 3D is a schematic planar view of the display panel including the display substrate illustrated in FIG. 2, and FIG. 5A is a schematic cross-sectional view taken along the line B-B' in FIG. 3D. As illustrated in FIG. 5A, the array substrate includes a light shielding structure 21 on the second base substrate 20. An orthographic projection of the second annular opening of the black matrix on the light shielding structure is at least partially within the light shielding structure. For example, an entirety of the orthographic projection of the second annular opening of the black matrix on the light shielding structure is within the light shielding structure, which better avoids light leakage. FIG. 5B is a schematic cross-sectional view of a pixel circuit layer in the display region of the display panel in FIG. 5A. For example, the array substrate further includes the pixel circuit layer including a driving circuit, such as a pixel driving circuit. For example, a buffer layer 15 is provided on the second base substrate 20 to protect the second base substrate 20 and prevent impurities of the second base substrate 20 from polluting the structure formed on the second base substrate 20. The driving circuit includes a thin film transistor, such as a driving transistor. As illustrated in FIG. 5B, the thin film transistor includes a gate electrode 50, a semiconductor layer 60, and a source electrode 181 and a drain electrode 182. The driving circuit layer further includes a gate insulation layer 16 covering the gate electrode 50, a first insulation layer 17 insulating the semiconductor layer 60 from the source electrode 181 and the drain electrode 182, a common electrode 31, a pixel electrode 32 opposite to the common electrode 31, a second insulation layer 19 insulating the common electrode 31 from the source electrode 181 and the drain electrode 182, and a third insulation layer 35 insulating the common electrode 31 from the pixel electrode 32. The pixel electrode 32 is electrically connected to the drain electrode 182 through a via hole passing through the second insulation layer 19 and the third insulation layer 35. For example, the common electrode 31 is formed as a plate structure and is broken (disconnected) at the position where the via hole is provided. By applying a common voltage to the common electrode and applying a data voltage to the pixel electrode, the data voltage and the common voltage form a deflection electric field to deflect the liquid crystals, so that the liquid crystals act as an optical switch and cooperate with the color filter layer to realize color display. For example, the pixel circuit layer further includes various signal lines, such as a gate line connected to the gate electrode to provide a scan voltage to the gate electrode 50, a data line connected to the source electrode to provide the data voltage to the source electrode 181, the drain electrode 182 and the pixel electrode, and a power supply line to provide the common voltage to the common electrode, which may be designed with reference to conventional technology in the art.

Referring to FIG. 5A and FIG. 5B, for example, the light shielding structure 21 is arranged in a same layer as the data line and made of a same material as the data line. For example, signal lines in the driving circuit (such as the data line or other signal lines arranged in the same layer as the data line) further serves as the light shielding structure 21, so that it is not necessary to design the light shielding structure additionally, and the wiring space is saved.

Alternatively, the light shielding structure 21 is arranged in a same layer as the gate line and made of a same material as the gate line. For example, signal lines in the driving circuit (e.g., the gate line or other signal lines arranged in the same layer as the gate line) further serves as the light shielding structure 21, so that there is no need to design the light shielding structure additionally, and the wiring space is saved.

The embodiments of the present disclosure do not limit the specific type of the signal line which further serves as the light shielding structure 21, and it may be designed according to the specific wiring design of the driving circuit in combination with the position of the second annular opening 12.

At least one embodiment of the present disclosure provides a display device, which includes any one of the display substrates provided by the embodiments of the present disclosure. For example, the display device may be a display panel.

Figure 6:
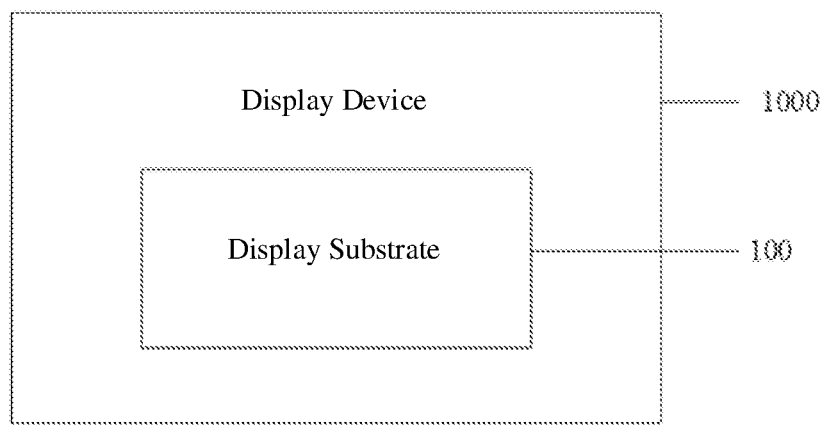
FIG. 6 is a schematic diagram of a display device provided by at least one embodiment of the present disclosure.

Exemplarily, FIG. 6 is a schematic diagram of a display device provided by at least one embodiment of the present disclosure. As illustrated in FIG. 6, the display device 1000 provided by at least one embodiment of the present disclosure includes any one of the display substrates 100 provided by the embodiments of the present disclosure.

For example, other structures of the display device 1000, such as a backlight required by the liquid crystal display device, may be designed with reference to conventional technologies in the art, and the embodiments of the present disclosure are not limited to this.

For example, the display device is the above-mentioned display panel. For another example, the display device is the liquid crystal display device for example including the above display panel and the backlight, or a display with other structures, for example, mobile phones, tablet computers, displays, notebook computers, ATMs and other products.

What have been described above are only specific implementations of the present disclosure, the protection scope of the present disclosure is not limited thereto. The protection scope of the present disclosure should be based on the protection scope of the claims.

What is claimed is:

1. A display substrate, comprising:
    a display region comprising a display array, wherein the display array comprises a plurality of display pixels distributed in an array, and each of the plurality of display pixel comprises a plurality of sub-pixels;
    a frame region at least partially surrounding the display region;
    a black matrix comprising a first part in the display region and a second part in the frame region, wherein the first part defines the plurality of sub-pixels; and
    an alignment mark which is in the frame region and at a side of the second part of the black matrix away from the display region, and is spaced apart from the black matrix, wherein
    a planar shape of the second part of the black matrix has a corner part, the alignment mark is opposite to the corner part, and an outer contour of the corner part opposite to the alignment mark comprises a concave part which is concave towards the display region;
    a planar shape of the display substrate comprises a plurality of corners and a plurality of the alignment marks; a planar shape of the second part of the black matrix comprises a plurality of corner parts, the plurality of the alignment marks are respectively at the plurality of corners of the display substrate in a one-to-one correspondence manner and are in one-to-one correspondence with the plurality of corner parts of the second part of the black matrix;
    the second part of the black matrix is provided with a first annular opening in the frame region, and the first annular opening surrounds the display region;
    the second part of the black matrix is broken at the first annular opening, the first annular opening divides the second part of the black matrix into an inner part and an outer part which are spaced apart from each other, the inner part is at a side of the first annular opening close to the display region, and the outer part is at a side of the first annular opening away from the display region;
    the array substrate has a first edge extending in a first direction and a second edge extending in a second direction, and the second direction intersects with the first direction;
    the first annular opening has a corner part opposite to the corner part of the second part of the black matrix, and a planar shape of the corner part of the first annular opening includes a line segment extending in a third direction which intersects both the first direction and the second direction.

2. The display substrate according to claim 1, wherein a planar shape of the concave part is complementary to a planar shape of an outer contour of the alignment mark close to the concave part.

3. The display substrate according to claim 2, wherein
    the outer contour of the alignment mark close to the concave part is right-angled, and the concave part is right-angled; or,
    the outer contour of the alignment mark close to the concave part is arc-shaped, and the concave part is arc-shaped.

4. The display substrate according to claim 1, wherein a maximum distance between the concave part and the alignment mark is less than 0.5 mm.

5. The display substrate according to claim 1, wherein a distance from an edge of the black matrix away from the display region to an edge of the display substrate is less than or equal to 0.5 mm, and the edge of the black matrix and the edge of the display substrate are on a same side of the display region.

6. A display substrate, comprising:
    a display region comprising a display array, wherein the display array comprises a plurality of display pixels distributed in an array, and each of the plurality of display pixel comprises a plurality of sub-pixels;
    a frame region at least partially surrounding the display region;
    a black matrix comprising a first part in the display region and a second part in the frame region, wherein the first part defines the plurality of sub-pixels; and
    an alignment mark which is in the frame region and at a side of the second part of the black matrix away from the display region, and is spaced apart from the black matrix, wherein
    a planar shape of the second part of the black matrix has a corner part, the alignment mark is opposite to the corner part, and an outer contour of the corner part opposite to the alignment mark comprises a concave part which is concave towards the display region;
    the second part of the black matrix is provided with a first annular opening in the frame region, and the first annular opening surrounds the display region;
    the second part of the black matrix is broken at the first annular opening, the first annular opening divides the second part of the black matrix into an inner part and an outer part which are spaced apart from each other, the inner part is at a side of the first annular opening close to the display region, and the outer part is at a side of the first annular opening away from the display region;
    a width of the first annular opening in a direction from the display region to the frame region is less than or equal to 50 μm; and
    a distance between an edge of the first annular opening away from the display region and an edge of the display substrate is greater than or equal to 0.2 mm and less than or equal to 1.0 mm, and the edge of the first annular opening away from the display region and the edge of the display substrate is are a same side of the display region.

7. The display substrate according to claim 1, wherein a width of the inner part in a direction from the display region to the frame region is larger than a width of the outer part in the direction from the display region to the frame region.

8. The display substrate according to claim 1, wherein
    the second part of the black matrix is provided with a second annular opening in the frame region, and the second annular opening surrounds the display region and is at a side of the first annular opening close to the display region;

the inner part is broken at the second annular opening, the second annular opening divides the inner part into a first part and a second part which are spaced apart from each other, the first part is at a side of the second annular opening close to the display region, and the second part is at a side of the second annular opening away from the display region.

9. The display substrate according to claim 8, wherein a distance from an edge of the second annular opening close to the display region to an edge of the display region is greater than or equal to 0.1 mm and less than or equal to 0.5 mm, and a width of the second annular opening in a direction from the display region to the frame region is less than or equal to 50 μm.

10. The display substrate according to claim 8, wherein the first annular opening is a closed ring, the second annular opening is a closed ring, and the first annular opening surrounds the second annular opening.

11. A display substrate, comprising:
a display region comprising a display array, wherein the display array comprises a plurality of display pixels distributed in an array, and each of the plurality of display pixel comprises a plurality of sub-pixels;
a frame region at least partially surrounding the display region;
a black matrix comprising a first part in the display region and a second part in the frame region, wherein the first part defines the plurality of sub-pixels; and
an alignment mark which is in the frame region and at a side of the second part of the black matrix away from the display region, and is spaced apart from the black matrix, wherein
a planar shape of the second part of the black matrix has a corner part, the alignment mark is opposite to the corner part, and an outer contour of the corner part opposite to the alignment mark comprises a concave part which is concave towards the display region;
the second part of the black matrix is provided with a first annular opening in the frame region, and the first annular opening surrounds the display region;
the second part of the black matrix is broken at the first annular opening, the first annular opening divides the second part of the black matrix into an inner part and an outer part which are spaced apart from each other, the inner part is at a side of the first annular opening close to the display region, and the outer part is at a side of the first annular opening away from the display region;
the second part of the black matrix is provided with a second annular opening in the frame region, and the second annular opening surrounds the display region and is at a side of the first annular opening close to the display region;
the inner part is broken at the second annular opening, the second annular opening divides the inner part into a first part and a second part which are spaced apart from each other, the first part is at a side of the second annular opening close to the display region, and the second part is at a side of the second annular opening away from the display region;
the display substrate further comprises a first base substrate, and the black matrix and the alignment mark is on the first base substrate;
the display substrate is a color filter substrate, and the color filter substrate comprises a color filter layer which is at least partially at a side of the black matrix away from the first base substrate and comprises a part in the frame region; and
an orthographic projection of the second annular opening on the first base substrate is within an orthographic projection of the part of the color filter layer in the frame region on the first base substrate.

12. The display substrate according to claim 11, wherein the color filter layer comprises a first color filter provided at the side of the black matrix away from the first base substrate; and
the orthographic projection of the second annular opening on the first base substrate is within an orthographic projection of the first color filter on the first base substrate, and a color of the first color filter is blue.

13. The display substrate according to claim 12, wherein the color filter layer further comprises a second color filter which is stacked with the first color filter and at a side of the first color filter away from the first base substrate in the frame region;
the orthographic projection of the second annular opening on the first base substrate is within the orthographic projection of the first color filter on the first base substrate and within an orthographic projection of the second color filter on the first base substrate; and
a color of the second color filter is different from the color of the first color filter.

14. The display substrate according to claim 1, wherein the alignment marks are in a same layer and made of a same material as the black matrix.

15. A display panel comprising the display substrate according to claim 1.

16. The display panel according to claim 15, further comprising: an array substrate opposite to the display substrate, wherein
the black matrix is at a side of the display substrate close to the array substrate;
the display substrate further comprises a first base substrate, and the black matrix and the alignment mark are provided on the first base substrate;
the display panel further comprises a frame sealant between the display substrate and the array substrate and in the frame region; and
the second part of the black matrix is provided with a first annular opening in the frame region, an orthographic projection of the first annular opening on the first base substrate is within an orthographic projection of the frame sealant on the first base substrate, and the frame sealant is made of an insulation material.

17. The display panel according to claim 16, wherein
a width of the frame sealant in a direction from the display region to the frame region is greater than 0.4 mm and less than 1.5 mm; and
a distance between an edge of the frame sealant away from the display region and an edge of the display panel is greater than or equal to 0.2 mm and less than or equal to 0.5 mm, and the edge of the frame sealant away from the display region and the edge of the display panel are at a same side of the display region.

18. The display panel according to claim 1, wherein line segment extending in the third direction of the corner part of the first annular opening is a curved line segment or a straight line segment.

* * * * *